United States Patent
Wang

(10) Patent No.: US 8,289,915 B2
(45) Date of Patent: Oct. 16, 2012

(54) METHOD AND SYSTEM FOR USING LOGICAL RESOURCES

(75) Inventor: Yun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 12/701,003

(22) Filed: Feb. 5, 2010

(65) Prior Publication Data
US 2010/0135241 A1 Jun. 3, 2010

Related U.S. Application Data

(63) Continuation of application No. PCT/CN2008/073479, filed on Dec. 12, 2008.

(30) Foreign Application Priority Data

Dec. 14, 2007 (CN) .......................... 2007 1 0302111

(51) Int. Cl.
*H04W 72/04* (2009.01)
(52) U.S. Cl. ........ 370/329; 370/338; 370/341; 709/203; 709/226; 718/104
(58) Field of Classification Search .................. None
See application file for complete search history.

(56) References Cited

U.S. PATENT DOCUMENTS

| 5,034,993 A | 7/1991 | Sasuta et al. | 455/7 |
| 2005/0028012 A1 | 2/2005 | Amamiya et al. | 726/4 |
| 2007/0264986 A1 | 11/2007 | Warrillow et al. | 455/414.3 |
| 2008/0066070 A1* | 3/2008 | Markov | 718/103 |
| 2008/0155100 A1* | 6/2008 | Ahmed et al. | 709/226 |
| 2009/0049443 A1* | 2/2009 | Powers et al. | 718/100 |

FOREIGN PATENT DOCUMENTS

| CN | 1578486 A | 2/2005 |
| CN | 1744761 A | 3/2006 |
| CN | 1798094 A | 7/2006 |
| CN | 1879441 A | 12/2006 |
| EP | 1 220 557 A1 | 7/2002 |
| EP | 1 443 790 A1 | 8/2004 |
| WO | WO 99/17575 | 4/1999 |

OTHER PUBLICATIONS

English Translation of Written Opinion of the International Searching Authority, PCT/CN2008/073479, dated Mar. 5, 2009, 4 pages.

(Continued)

*Primary Examiner* — Chi H. Pham
*Assistant Examiner* — Shick Hom
(74) *Attorney, Agent, or Firm* — Slater & Matsil, L.L.P.

(57) ABSTRACT

The present invention discloses a method and system for using logical resources. The method includes: dividing a logical resource pool into at least one private resource pool and at least one shared resource pool, each of which matches one license that includes functions supported by the resource pool and/or capacity of the resource pool; enabling each private resource pool to be privately owned by one operator and each shared resource pool be shared by at least two operators; and using logical resources according to the license information. With the method and system of the present invention, it is easy to determine the apportionment rates of initial network construction costs and later expansion expenses and operators can expand capacity independently.

19 Claims, 2 Drawing Sheets

OTHER PUBLICATIONS

Chinese Application No. 200710302111.8, dated Sep. 13, 2010, 9 pages.
Extended European Search Report, European Application No. 08866621.9-2413 / 2180737, PCT/CN2008073479, Dated: May 4, 2011, 5 pages.

Second Chinese Office Action, Chinese Application No. 200710302111.8, Dated Sep. 23, 2011, 5 pages.
Chinese Office Action and partial translation received in Chinese Patent Application No. 200710302111.8, mailed May 4, 2012, 9 pages.

* cited by examiner

METHOD AND SYSTEM FOR USING LOGICAL RESOURCES

CROSS-REFERENCE TO RELATED APPLICATIONS

This application is a continuation of International Application No. PCT/CN2008/073479, filed on Dec. 12, 2008, which claims priority to Chinese Patent Application No. 200710302111.8, filed on Dec. 14, 2007, both of which are hereby incorporated by reference in their entireties.

FIELD OF THE INVENTION

The present invention relates to network sharing technologies, and in particular, to a method and system for using logical resources.

BACKGROUND OF THE INVENTION

Network sharing means multiple network operators share network resources so as to reduce the network construction cost and enable faster network service deployment.

In a Wideband Code Division Multiple Access (WCDMA) system, Radio Access Network (RAN) sharing, as a solution of network sharing, allows multiple operators to share physical equipment such as sites, NodeBs and Radio Network Controllers (RNCs) and share Iub transport resources while the operators have independent frequency bands and core networks.

For the multiple operators, although NodeBs and RNCs and other physical equipment are shared, their cells are independent. In the prior art, multiple cells share logical resources and cells of different operators contend for logical resources freely. Then, the consumption of logical resources by cells and operators is measured and the operators negotiate their benefits according to the measurement.

The inventor finds the following weakness in the prior art: because different operators contend for logical resources freely, the apportionment rates of initial network construction costs and later expansion expenses are hard to determine and it is hard for an operator to expand its network capacity independently.

SUMMARY

An embodiment of the present invention provides a method for using logical resources so that it is easy to determine the apportionment rates of initial network construction costs and later expansion expenses and that operators can expand capacity independently.

Another embodiment of the present invention provides a system for using logical resources so that it is easy to determine the apportionment rates of initial network construction costs and later expansion expenses and that operators can expand capacity independently.

The technical solution of the embodiments of the present invention is as follows:

A method for using logical resources includes:

dividing a logical resource pool into at least one private resource pool and at least one shared resource pool, each of which has corresponding license information that includes functions supported by the resource pool and/or capacity information of the resource pool;

enabling each private resource pool to be privately owned by one operator and each shared resource pool be shared by at least two operators; and using logical resources according to the license information.

A system for using logical resources includes:

an allocating unit, configured to: divide a logical resource pool into at least one private resource pool and at least one shared resource pool, allocate a license information for each private resource pool or shared resource pool, where the license information may include functions supported by the resource pool and/or capacity of the resource pool; and allocate each private resource to one operator for private use and allocate each shared resource pool to at least two operators for shared use; and a using unit, configured to use logical resources according to the license information allocated by the allocating unit.

In the embodiments of the present invention, shared resource pool and private resource pool are adopted, and private resource pool is allocated for private use of an operator and shared resource pool is allocated for shared use of at least two operators. The operators use logical resources according to the planned resource pools so that it is easy to determine the apportionment rates of initial network construction costs and later expansion expenses and that operators can expand capacity independently.

DETAILED DESCRIPTION OF THE EMBODIMENTS

Figure 1:
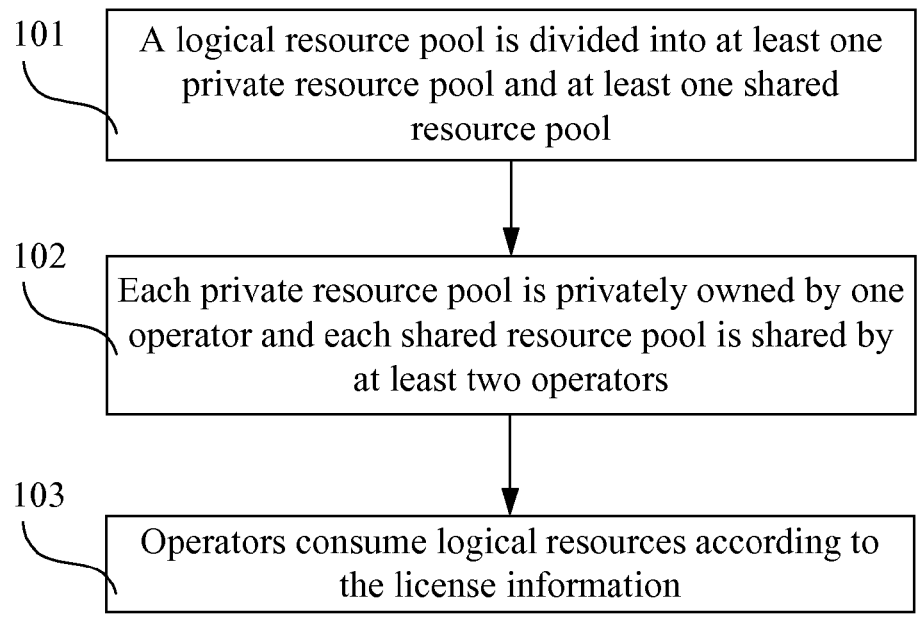
FIG. 1 shows a flowchart of a method for using logical resources according to an embodiment of the present invention.

FIG. 1 shows a flowchart of a method for using logical resources according to an embodiment of the present invention. The method includes:

101: Logical resource pool is divided into at least one private resource pool and at least one shared resource pool. Each private resource pool or shared resource pool has corresponding license information. The license information may include functions supported by the resource pool and/or capacity of the resource pool.

102: Each private resource pool is privately owned by one operator and each shared resource pool is shared by at least two operators.

103: The operators use logical resources according to the license information.

The logical resources may include: baseband processing resources and/or power resources. The baseband processing resources may include Channel Element (CE) resources and/or High Speed Packet Access (HSPA) user number resources.

Exemplary embodiments may be described in detail.

Figure 2:
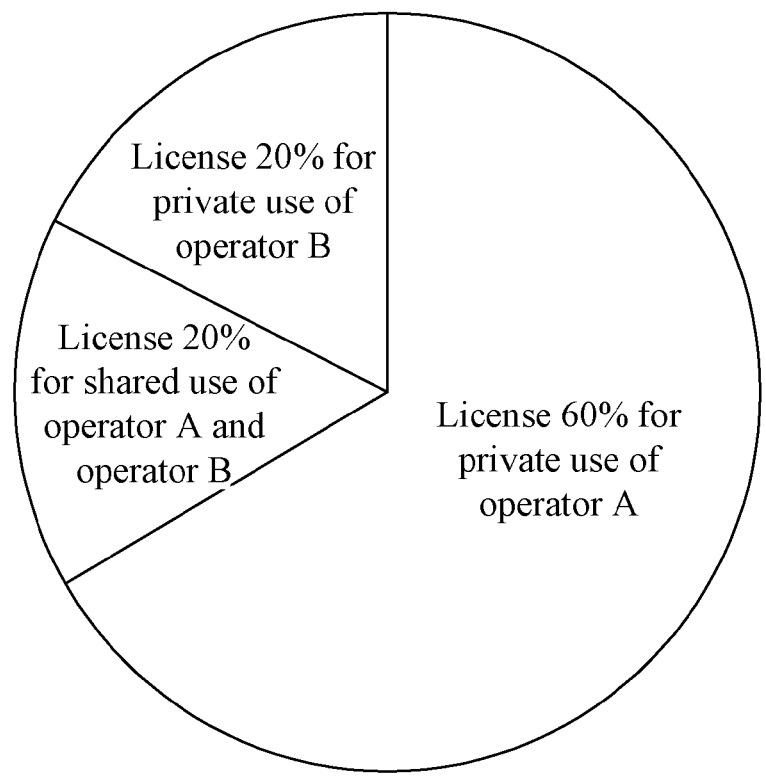
FIG. 2 shows division of resource pool according to an embodiment of the present invention.

FIG. 2 shows the division of resource pool according to the first embodiment of the present invention. In the embodiment, a network is operated by two operators, operator A and operator B. The logical resource pool is divided into two private resource pools and one shared resource pool. The license information corresponding to the private resource pool allocated for operation A includes the capacity information which specifies 60%, indicating that logical resources allocated for operator A account for 60% of the total logical resources of the system; the license information corresponding to the private resource pool allocated for operation B includes the capacity information which specifies 20%, indicating that logical resources allocated for operator B account for 20% of the total logical resources of the system; the license information corresponding to the shared resource pool allocated for operator A and operator B includes the capacity information which specifies 20%, indicating that shared logical resources allocated for operator A and operator B account for 20% of the total logical resources of the system. The information of each license may also include information of functions supported by the corresponding resource pool. In addition, the capacity information of each resource pool may be 0 and the information of functions supported by a resource pool may be not supported.

Then, logical resources are used according to the above license information.

In other embodiments of the present invention, there may be more operators in the network and the capacity of private resource pools and shared resource pools allocated for the operators may vary. They are not limited by the embodiments of the present invention.

The network entity that divides the resource pool may be an Operation & Maintenance Center (OMC).

After above division, the system may preferentially use logical resources in the private resource pool of the operator that owns a cell where the User Equipment (UE) is located, according to information of the cell.

If logical resources are CE resources, the using of logical resources in the private resource pool of the operator that owns the cell preferentially includes: when the UE requests to access the cell, the RNC sends a link set up request to the NodeB and first uses CE resources in the private resource pool of the operator that owns the cell according to the corresponding license information; when CE resources in the private resource pool are insufficient, CE resources in the shared resource pool are used. If CE resources in the shared resource pool are still insufficient, the NodeB sends a link set up failure message to the RNC.

If logical resources are HSPA user number resources, the using of logical resources in the private resource pool of the operator that owns the cell in precedence includes: when an HSPA UE requests to access the cell, the RNC sends a link set up request to the NodeB and first uses HSPA user number resources in the private resource pool of the operator that owns the cell according to the corresponding license information; when HSPA user number resources in the private resource pool are insufficient, HSPA user number resources in the shared resource pool are used.

If logical resources are power resources, the using of logical resources in the private resource pool of the operator that owns the cell in precedence includes: when the local cell is set up, power resources in the private resource pool of the operator that owns the cell are first used according to the corresponding license information; when power resources in the private resource pool are insufficient, power resources in the shared resource pool are used.

If logical resources are High Speed Downlink Packet Access (HSDPA) resources, transport bandwidth resources or other logical resources, the using of logical resources in the private resource pool of the operator that owns the cell in precedence is similar to the methods where logical resources are baseband processing resources and/or power resources and is therefore omitted here.

The system may control the functions. The system determines whether the private resource pool or shared resource pool of the operator that owns the cell supports the network function required by the UE according to the license information and if yes, allows the UE use the network function in the cell.

Taking the HSPA function as an example, if the private or shared resource pool of the operator that owns the cell supports HSPA, the system allows set up of an HSPA cell, or else, the system does not allow set up of the HSPA cell.

Figure 3:
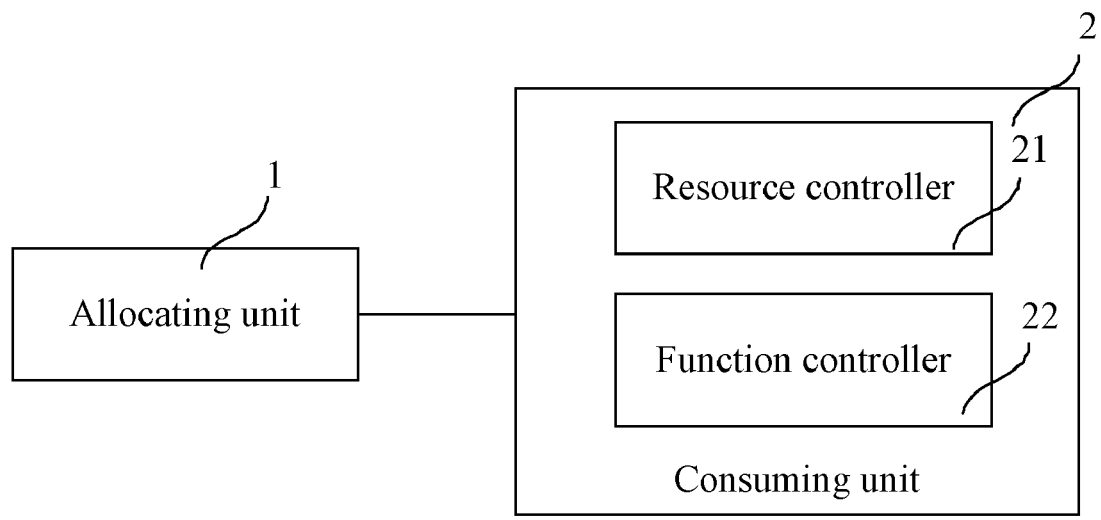
FIG. 3 shows a structure of a system for using logical resources according to an embodiment of the present invention.

FIG. 3 shows a structure of a system for using logical resources according to an embodiment of the present invention. The system includes:

an allocating unit 1, configured to: divide a logical resource pool into at least one private resource pool and at least one shared resource pool, allocate a license information for each private resource pool or shared resource pool, where license information may include information of functions supported by the resource pool and/or capacity information of the resource pool; and allocate each private resource to one operator for private use and allocate each shared resource pool to at least two operators for shared use; and a using unit 2, configured to use logical resources according to the license information allocated by the allocating unit.

The using unit 2 may include: a resource controller 21, configured to preferentially use logical resources in the private resource pool allocated for the operator that owns a cell where a UE is located, according to information of the cell where the UE is located.

The using unit 2 may further include a function controller 22, configured to determine whether the private resource pool or shared resource pool allocated by the allocating unit for the operator that owns where a UE is located the cell supports the network function required by the UE or not, according to the license information, and if the network function required by the UE is supported, allows the UE use the network function in the cell.

In the system, the allocating unit may be an OMC and the resource controller or function controller may be a NodeB or an RNC.

To sum up, with the method and system provided by the embodiments of the present invention, logical resources owned by operators can be allocated and controlled according to predetermined rates and the operators use logical resources according to the predetermined rates so that the apportionment rates of initial network construction costs and later expansion expenses can be easily determined and that operators can expand network capacity independently. In addition, the functions and capacity of each resource pool can be controlled according to the license information.

It is understandable to those skilled in the art that all or part of the steps in the methods according to the preceding embodiments may be performed by hardware instructed by a program. The program may be stored in a computer readable storage medium, such as a Read-Only Memory/Random Access Memory (ROM/RAM), a magnetic disk, and a compact disk.

Although the present invention has been described through several exemplary embodiments, the invention is not limited to such embodiments. It is apparent that those skilled in the art can make various modifications and variations to the invention without departing from the scope of the present invention. The invention is intended to cover the modifications and variations provided that they fall in the scope of protection defined by the following claims or their equivalents.

What is claimed is:

1. A method for using logical resources, the method comprising:

dividing a logical resource pool into private resource pool privately owned by one operator and shared resource pool shared by at least two operators, wherein the private resource pool has corresponding license information for restricting a network function supported by the private resource pool, and the shared resource pool has corresponding license information, for restricting a network function supported by the shared resource pool; and using logical resources according to corresponding license information, wherein using logical resources according to corresponding license information comprises:

determining whether resource pool of an operator that owns a cell where a User Equipment (UE) is located supports the network function required by the UE or not, according to the corresponding license information; and allowing the UE use the network function in the cell if the network function required by the UE is supported.

2. The method according to claim 1, wherein the private resource pool further has corresponding license information for restricting a proportion of logical resources in the logical resource pool which logical resources in the private resource pool account for, and the shared resource pool further has corresponding license information for restricting a proportion of logical resources in the logical resource pool which logical resources in the shared resource pool account for, wherein the using logical resources according to the license information comprises:

preferentially using, according to information of a cell where the UE is located and corresponding license information, logical resources in the a private resource pool of an operator that owns the cell.

3. The method according to claim 2, wherein the logical resources are Channel Element CE resources, and the preferentially using comprises: sending, by a Radio Network Controller (RNC) when the UE requests to access the cell, a link set up request to a NodeB and using firstly CE resources in the private resource pool of the operator that owns the cell according to the corresponding license information; using CE resources in the shared resource pool if the CE resources in the private resource pool are insufficient.

4. The method according to claim 2, wherein the logical resources are High Speed Packet Access (HSPA) user number resources, and the preferentially using comprises: sending, by a RNC, when an HSPA UE requests to access the cell, a link set up request to a NodeB and using firstly HSPA user number resources in the private resource pool of the operator that owns the cell according to the corresponding license information; using HSPA user number resources in the shared resource pool if the HSPA user number resources in the private resource pool are insufficient.

5. The method according to claim 2, wherein the logical resources are power resources, and the preferentially using comprises: using firstly power resources in the private resource pool of the operator that owns the cell according to the corresponding license information when a local cell is set up; using power resources in the shared resource pool if power resources in the private resource pool are insufficient.

6. The method according to claim 1, wherein the network function is a high speed packet access function.

7. A device for using logical resources, comprising:

a using unit, configured to use logical resources, according to license information of private resource pool privately owned by one operator, where the license information of the private resource pool is for restricting a network function supported by the private resource pool, and license information of shared resource pool shared by at least two operators, where the license information of the shared resource pool is for restricting a network function supported by the shared resource pool wherein the using unit comprises:

a function controller, configured to determine whether a private resource pool or shared resource pool allocated for an operator that owns a cell where a UE is located supports a network function required by the UE or not, according to corresponding license information, and if the network function required by the UE is supported, allows the UE use the network function in the cell.

8. The device of claim 7, wherein the private resource pool further has corresponding license information, for restricting a proportion of logical resources in a logical resource pool which logical resources in the private resource pool account for, and the shared resource pool further has corresponding license information, for restricting a proportion of logical resources in the logical resource pool which logical resources in the shared resource pool account for, the using unit further comprises: a resource controller, configured to preferentially use logical resources in a private resource pool allocated for an operator that owns a cell where the UE is located, according to information of the cell and corresponding license information.

9. The device of claim 8, wherein the resource controller is a NodeB or a Radio Network Controller (RNC).

10. The device of claim 7, wherein the function controller is a NodeB or a Radio Network Controller (RNC).

11. A system for using logical resources, comprising:

an allocating unit, configured to divide a logical resource pool into at least one private resource pool and at least one shared resource pool, allocate a license information for each private resource pool for restricting a network function supported by the private resource pool and a license information for each shared resource pool for restricting a network function supported by the shared resource pool, and allocate each private resource pool to one operator for private use and allocate each shared resource pool to at least two operators for shared use; and a using unit, configured to use logical resources according to corresponding license information allocated by the allocating unit, wherein the using unit comprises:

a function controller, configured to determine whether a resource pool allocated by the allocating unit for an operator that owns a cell where a UE is located supports a network function required by the UE or not, according to corresponding license information, and allows the UE use the network function in the cell if the network function required by the UE is supported.

12. The system of claim 11, wherein the allocating unit is an Operation & Maintenance Center (OMC).

13. The system of claim 11, wherein the allocating unit is further configured to allocate a license information for each private resource pool for restricting a proportion of logical resources in the logical resource pool which logical resources in the private resource pool account for, and further configured to allocate a license information for each shared resource pool for restricting a proportion of logical resources in the logical resource pool which logical resources in the shared resource pool account for, and the using unit further comprises:

a resource controller, configured to preferentially use logical resources in a private resource pool allocated for an operator that owns a cell where a User Equipment (UE) is located, according to information of the cell and corresponding license information.

14. The system of claim 13, wherein the resource controller is a NodeB or a Radio Network Controller (RNC).

15. The system of claim 14, wherein the allocating unit is an Operation & Maintenance Center.

16. The system of claim 11, wherein the function controller is a NodeB or a Radio Network Controller (RNC).

17. The system of claim 16, wherein the allocating unit is an Operation & Maintenance Center.

18. The device of claim 8, wherein the logical resources are at least one of Channel Element resources, High Speed Packet Access user number resources, and power resources.

19. The system of claim 13, wherein the logical resources are at least one of Channel Element resources, High Speed Packet Access user number resources, and power resources.

* * * * *